(12) United States Patent
Hicks et al.

(10) Patent No.: US 10,540,488 B2
(45) Date of Patent: Jan. 21, 2020

(54) DYNAMIC FACE AND VOICE SIGNATURE AUTHENTICATION FOR ENHANCED SECURITY

(71) Applicant: Microsoft Technology Licensing, LLC, Redmond, WA (US)

(72) Inventors: Carson J. Hicks, Seattle, WA (US); John C. Gordon, Newcastle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 59 days.

(21) Appl. No.: 15/430,155

(22) Filed: Feb. 10, 2017

(65) Prior Publication Data
US 2018/0232591 A1    Aug. 16, 2018

(51) Int. Cl.
| | |
|---|---|
| *G06K 9/00* | (2006.01) |
| *G06F 21/32* | (2013.01) |
| *G06K 9/62* | (2006.01) |
| *G10L 17/24* | (2013.01) |

(52) U.S. Cl.
CPC ......... *G06F 21/32* (2013.01); *G06K 9/00288* (2013.01); *G06K 9/00892* (2013.01); *G06K 9/6297* (2013.01); *G10L 17/24* (2013.01)

(58) Field of Classification Search
None
See application file for complete search history.

(56) References Cited

U.S. PATENT DOCUMENTS

| | | | |
|---|---|---|---|
| 6,917,703 B1* | 7/2005 | Steffens | G06K 9/00281 382/118 |
| 2007/0155366 A1 | 7/2007 | Manohar et al. | |
| 2014/0289867 A1 | 9/2014 | Bukai | |
| 2014/0310764 A1 | 10/2014 | Tippett et al. | |
| 2015/0294138 A1* | 10/2015 | Barak | H04L 67/22 382/118 |

FOREIGN PATENT DOCUMENTS

| | | | | |
|---|---|---|---|---|
| KR | 20070095157 | * | 9/2007 | ............... G06K 9/00 |
| WO | WO2015168644 | | 11/2015 | |

OTHER PUBLICATIONS

Sesame integrates voice biometrics into Amazon Alexa, https://www.youtube.com/watch?v=PzPeWbEjFzA, 2016. 5. 8.*
Chetty et al. "Audio-Visual Multimodal Fusion for Biometric Person Authentication and Liveness Verification", Australian Computer Society, NICTA-HCSNet Multimodal User Interaction Workshop (MMUI2005), Sydney, Australia.*
Jadhav et al. "Human Identification using Face and Voice Recognition", International Journal of Computer Science and Information Technologies, vol. 2 (3), 2011, 1248-1252.*

(Continued)

*Primary Examiner* — Randolph I Chu

(57) ABSTRACT

Techniques and apparatuses for a dynamic face and voice signature authentication for enhanced authentication techniques are described herein. In one or more implementations, an authentication system is configured to authenticate a user using a combination of voice and facial recognition techniques. The authentication system supports multiple phrases per user, such that the user can use different phrases to gain different types of access to a device or resources. Doing so provides enhanced customized access to the device or resources.

20 Claims, 5 Drawing Sheets

(56) References Cited

OTHER PUBLICATIONS

Hassaballah et al. "Image Features Detection, Description and Matching", Springer International Publishing Switzerland 2016.*
Kim et al., "Person Authentication using Face, Teeth and Voice Modalities for Mobile Device Security", IEEE Transaction on Consumer Electronics, vol. 56, No. 4 Nov. 2010.*
Lalitha et al. "Person Authentication Using Face and Voice Modalities", International Journal of Advances in Science Engineering and Technology, ISSN: 2321-9009 vol.—1, Issue—2, Oct. 2013.*
AppLock from Sensory Keeps Apps Safe with Face and Voice Biometrics, https://www.sensory.com/applock-sensorykeeps-apps-safe-face-voice-biometrics/ (Year: 2016).*
Jain, et al., "Biometrics: A Tool for Information Security", In Journal of IEEE Transactions on Information Forensics and Security, vol. 1, No. 2, Jun. 2006, pp. 125-143.

* cited by examiner

DYNAMIC FACE AND VOICE SIGNATURE AUTHENTICATION FOR ENHANCED SECURITY

BACKGROUND

Passwords are burdensome to enter, odious to memorize, and hard to use in a public environment where a malicious actor may be able to detect the sequence of typed keys. Some systems authenticate users based on detection of biometric characteristics, such as fingerprint authentication, iris authentication, face authentication, or voice authentication. However, considered independently, each of these different types of authentication mechanisms are capable of being spoofed in order to gain access to the system. For example, fingerprints can be scanned and reprinted, static faces can be photographed or scanned and reprinted by a 3D printer, voices can be recorded and replayed with an audio recorder, and irises can be photographed.

Further, these spoofing techniques can be utilized in combination in order to gain access to systems that require multiple steps of verification. Consider, for example, a system that authenticates the user based on both fingerprint characteristics and facial characteristics. In this example, even though two step authentication is required, an unauthorized user could still gain access to the system using both a scanned and reprinted fingerprint and a 3D model of the user's face.

While the use of face recognition systems is becoming more prevalent, these systems remain vulnerable to spoofing attacks. For example, some traditional face recognition systems operate by extracting pose-invariant features pertaining to a user's face, such as the pose-invariant distances between various landmarks on the user's face. There remains a risk that a malicious actor can gain access to protected resources by presenting a photograph or three-dimensional bust to such a face recognition system, where that photograph or bust duplicates the appearance of an authorized user. The industry has countered this threat by using various liveness tests for discriminating between a live human user and a simulation thereof. But it remains at least theoretically possible for a malicious actor to spoof even these liveness tests. For example, if a recognition system makes verification conditional on the user performing successive actions, a malicious actor can successively present photographs or busts which provide static "snapshots" of these actions.

SUMMARY

Dynamic face and voice signature authentication for enhanced authentication techniques are described herein. In one or more implementations, an authentication system is configured to authenticate a user using a combination of voice and facial recognition techniques. The authentication system supports multiple phrases per user, such that the user can use different phrases to gain different types of access to a device or resources. Doing so provides enhanced customized access to the device or resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

DETAILED DESCRIPTION

Overview

Figure 1:
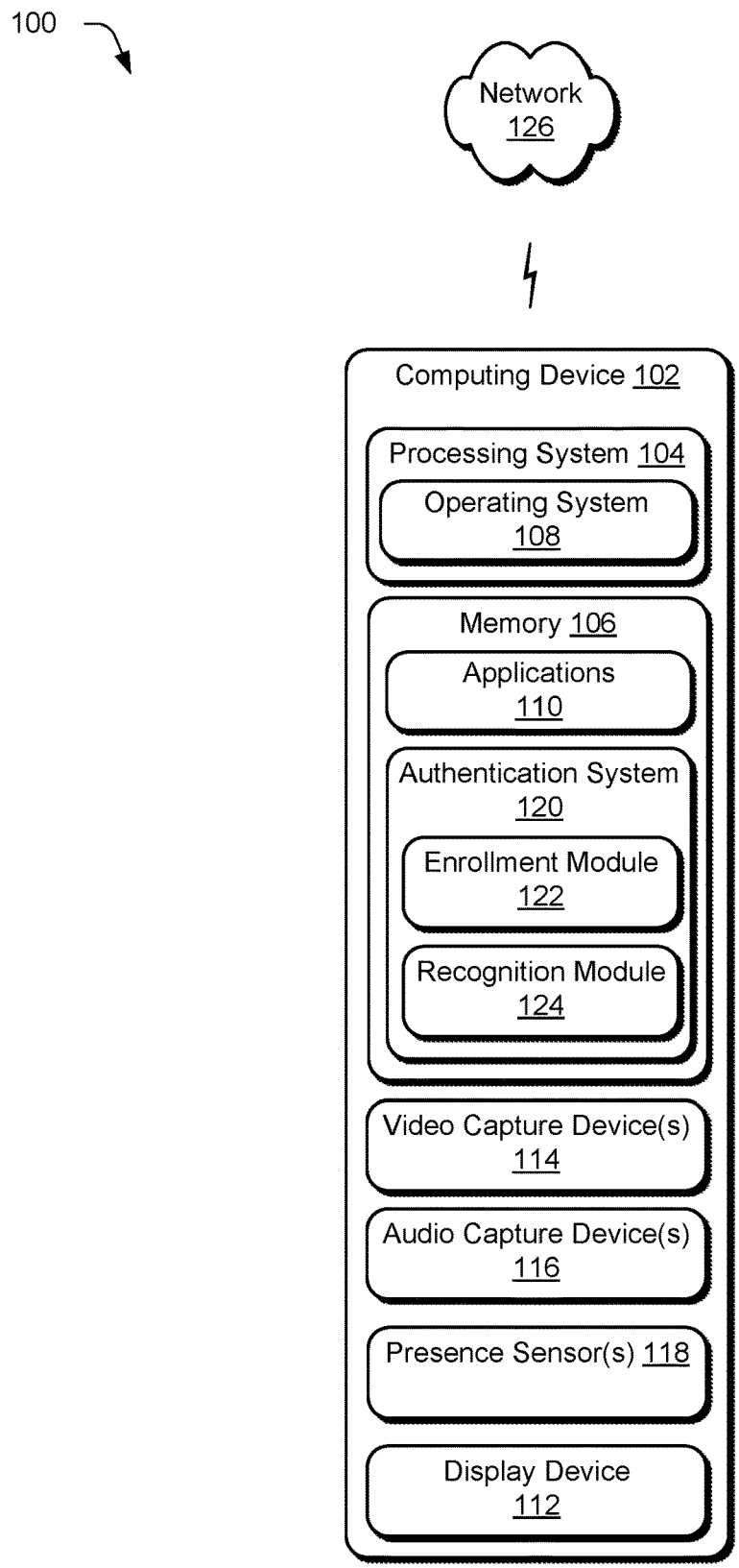
FIG. 1 is an illustration of an environment in an example implementation that is operable to support techniques described herein.

Dynamic face and voice signature authentication for enhanced authentication techniques are described herein. In one or more implementations, an authentication system is configured to authenticate a user using a combination of voice and facial recognition techniques. The authentication system supports multiple phrases per user, such that the user can use different phrases to gain different types of access. Doing so provides enhanced customized access to a device or resources.

In one or more implementations, in order to gain access to a device or resources, the user speaks an authentication phrase. In response, the authentication system receives, from a video capture device (e.g., a depth camera), a video stream of the user speaking, and also receives, from an audio capture device (e.g., a microphone array), an audio stream of the user speaking. The video stream is processed to identify a face of the user. In some cases, frames of the video stream are converted to a distance graph of the face of the user. Then, a dynamic face and voice signature is generated by correlating facial motion of the face of the user in the processed video stream to the audio stream of the user speaking. The dynamic face and voice signature of the user is compared to a stored dynamic face and voice signature of an authorized user, which was previously generated during an enrollment phase. The user is verified as the authorized user if the dynamic face and voice of the user matches the stored dynamic face and voice signature of the authorized user. Verifying the user by correlating facial motion of the user to the audio stream ensures that the user is actually speaking, thereby preventing situations in which a malicious actor uses a three-dimensional model of the user's face in combination with a recording of the user's voice in order to gain access.

The dynamic face and voice signatures may be generated in a variety of different ways. In one or more implementations, the face and voice signatures are generated using one or more machine learning techniques. For example, a classifier may be trained on user facial and voice characteristics in order to create distinct face and voice signatures. Such machine learning techniques may include a hidden Markov model (HMM), a long-short term memory, and so forth. In some cases, dynamic time warping may also be applied to account for the user speaking with varying speeds.

If, based on the comparison, the user is verified as the authorized user, then the audio stream is scanned to detect an authentication phrase. For example, the audio stream of the user speaking can be provided to a voice recognition component which translates the audio data into text, and compares the text to one or more previously stored authentication phrases. If the authentication phrase is detected in the audio data, then the user is authenticated and access to a device or resources is provided to the user. Alternately, if the authentication phrase is not detected, the user is prevented from accessing the device or resources, even if the user is verified based on the dynamic face and voice signature.

The type of access to the device or resources is based on the detected authentication phrase. The authentication system is configured to support multiple different authentication phrases for each user, where each authentication phrase may be associated with a different type of access to the device or resources. For example, in response to detecting a first authentication phrase, a first type of access to the device or resources can be provided to the user (e.g., unlocking a laptop and providing access to personal documents), and in response to detecting a second authentication phrase, a second type of access to the device or resources can be provided to the user (e.g., unlocking the laptop and providing access to work-related documents but not the personal documents).

In one or more implementations, the authentication system can be configured to recognize a duress phrase. In response to detecting the duress phrase, the authentication system can initiate an emergency action, such as by automatically contacting the authorities or encrypting all of the files on the user's device. This functionality may be useful in situations where a malicious actor forces the user to speak the authentication phrase in order to gain access to the user's device.

Notably, the authentication techniques described herein create a dynamic face and voice signature that is so a part of the user's identity that it cannot be spoofed or replicated, even when witnessed by other people. For example, even if the user speaks the authentication phrase in a crowded coffee shop, other users will be unable to access the system using the phrase because their facial and voice characteristics are different than the user. Furthermore, even if a malicious user has access to a three-dimensional model of the user's face and an audio recording of the user speaking the authentication phrase, this malicious actor will be unable to access the system because the audio of the authentication phrase is not correlated to the user's facial motion. In fact, the only way in which a malicious actor could gain access to this system would be to force the user to speak the authentication phrase. In these situations, however, the user can prevent access by speaking the duress phrase, as discussed above.

Example Environment

FIG. 1 is an illustration of an environment 100 in an example implementation that is operable to support techniques described herein. The illustrated environment 100 includes a computing device 102 having one or more hardware components, examples of which include a processing system 104 and a computer-readable storage medium that is illustrated as a memory 106 although other components are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, and so forth. Thus, the computing device 102 may range from full resource devices with substantial memory and processor resources (e.g., personal computers, game consoles) to a low-resource devices with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108, although other embodiments are also contemplated in which an operating system is not employed. The operating system 108 is configured to abstract underlying functionality of the computing device 102 to applications 110 that are executable on the computing device 102. For example, the operating system 108 may abstract the processing system 104, memory 106, and/or network functionality of the computing device 102 such that the applications 110 may be written without knowing "how" this underlying functionality is implemented. The application 110, for instance, may provide data to the operating system 108 to be rendered and displayed without understanding how this rendering will be performed. The operating system 108 may also represent a variety of other functionality, such as to manage a file system and user interface that is navigable by a user of the computing device 102.

Computing device 102 is further illustrated as including a display device 112 that can be controlled to render or display images for viewing. Display device 112 can be implemented as an integrated component of computing device 102, such as a touchscreen of a tablet device. Alternatively, display device can be implemented as an external, peripheral component to computing device 102, such as a display device coupled to a desktop computer.

Computing device 102 is also illustrated as including one or more video capture devices 114 and audio capture devices 116. Generally, video capture device 114 includes one or more cameras which are configured to capture a video stream of a user speaking. The video stream can then be processed to identify a face of the user. The one or more cameras may be implemented in a variety of different ways, such as a depth sensor, a multi-spectral camera, an IR, time-of-flight depth camera (e.g., a Kinect® sensor by Microsoft®), a structured light camera for detecting structure, an RGB camera, an IR camera, and so forth.

Generally, audio capture device 116 includes one or more microphones which are configured to capture an audio stream of the user speaking. In one or more implementations, audio capture device 116 includes a microphone array which enables the user's voice to be localized and paired to the same location as the face of the user identified in the video stream captured by video capture device 114.

In this example, computing device 102 is also illustrated as including one or more presence sensor(s) 118 which are implemented to detect the presence of the user, such as when the user enters a room. In some cases, detection of the user by presence sensor 118 triggers the video capture device 114 and audio capture device 116 to capture the video stream and audio stream, respectively, of the user speaking. Presence sensor 118 can be implemented in a variety of different ways, such as a PIR sensor, an ambient light sensor, and so forth.

Computing device 102 is further illustrated as including an authentication system 120 that is stored on computer-readable storage memory (e.g., memory 106), such as any suitable memory device or electronic data storage implemented by the computing device 102. In implementations, authentication system 120 is a component of the device operating system 108.

Authentication system 120 is representative of functionality to authenticate a user using a combination of voice and facial recognition techniques. The authentication system 120 supports multiple phrases per user, such that the user can use different phrases to gain different types of access. Doing so provides enhanced customized access to a device or resources. In this example, authentication system 120 is illustrated as including an enrollment module 122 and a recognition module 124. Enrollment module 122 can be implemented to generate and store a dynamic face and voice signature and an authentication phrase of an authorized user during an enrollment phase. The enrollment module 122 is discussed in further detail with regards to FIG. 2, below. Recognition module 124 can be implemented to provide access to a device or resources by detecting a dynamic face and voice signature and an authentication phrase. If the dynamic face and voice signature and the authentication phrase match the stored dynamic face and voice signature and authentication phrase generated during the enrollment phase, then the authentication system 120 provides access to the device or resources in accordance with the detected authentication phrase. The recognition module 124 is discussed in further detail with regards to FIG. 3 below.

Figure 5:
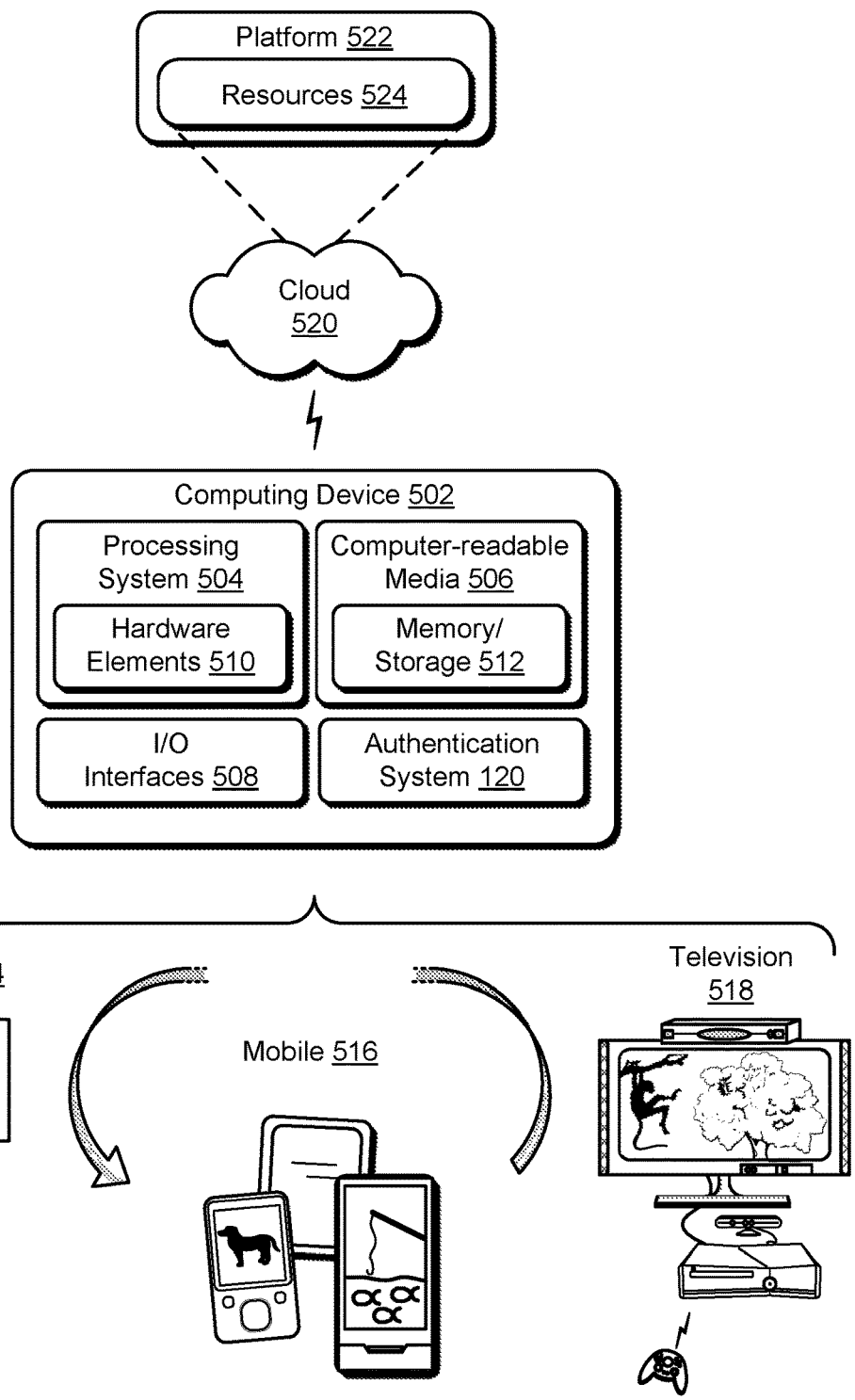
FIG. 5 illustrates an example system that includes an example computing device that is representative of one or more computing systems and/or devices that may implement the various techniques described herein.

Although illustrated as part of computing device 102, functionality of authentication system 120 may also be implemented in a distributed environment, remotely via a network 126 (e.g., "over the cloud") as further described in relation to FIG. 5, and so on. Although network 126 is illustrated as the Internet, the network may assume a wide variety of configurations. For example, network 126 may include a wide area network (WAN), a local area network (LAN), a wireless network, a public telephone network, an intranet, and so on. Further, although a single network 126 is shown, network 126 may also be configured to include multiple networks.

Enrollment Module

Figure 2:
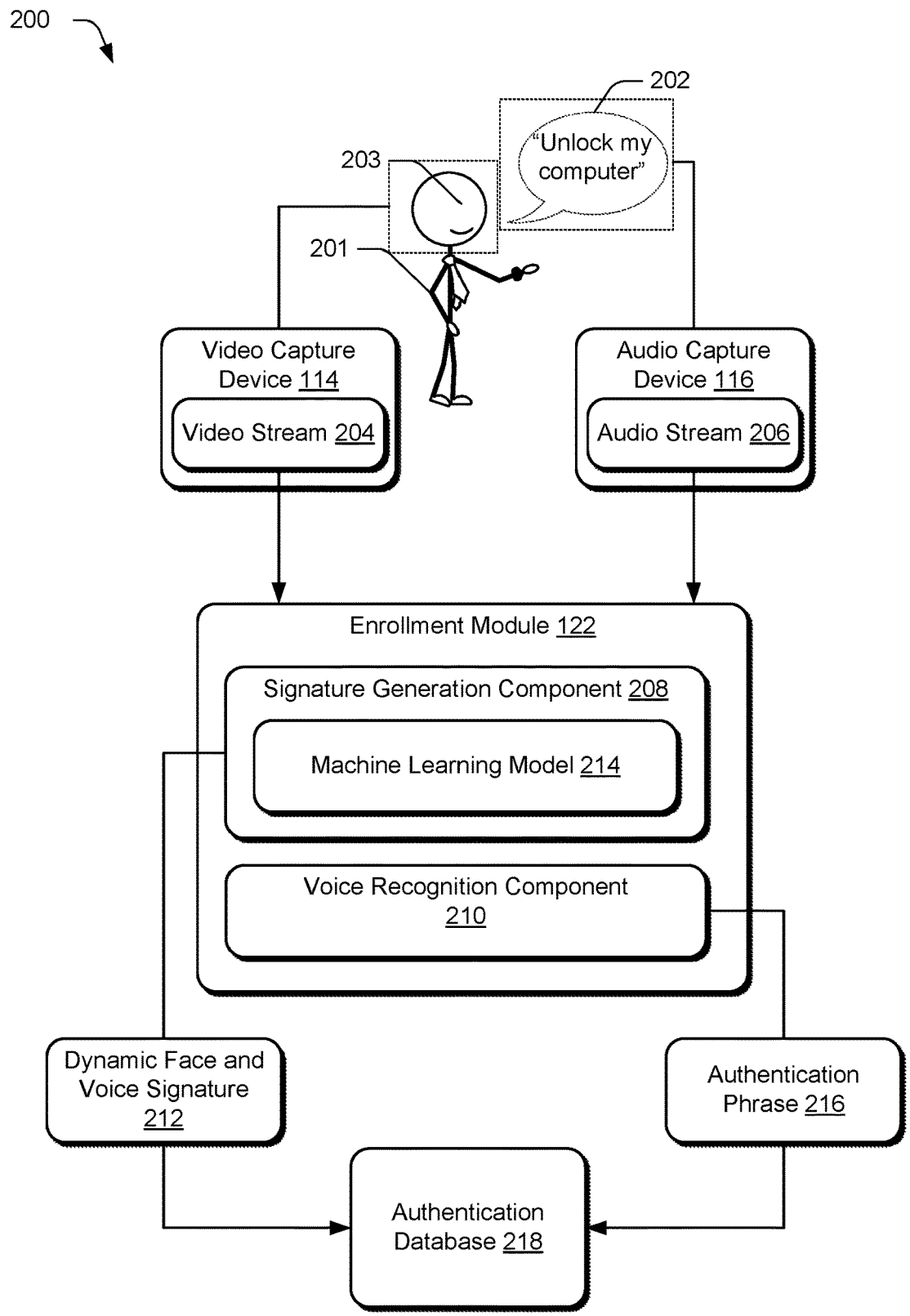
FIG. 2 illustrates a more-detailed example of the enrollment module of the authentication system of FIG. 1 in accordance with one or more implementations.

FIG. 2 illustrates a more-detailed example 200 of the enrollment module 122 of the authentication system 120 of FIG. 1 in accordance with one or more implementations. In this example, the enrollment module 122 provides a voice and/or graphical user interface presentation (not shown) which guides an authorized user 201 through an enrollment phase in which the enrollment module 122 asks the user to speak one or more authentication phrases.

In response, the user 201 speaks one or more words or phrases 202, which in this example include the words "unlock my computer". When the user 201 speaks the words or phrases 202, the video capture device 114 captures a video stream 204 of the user 201 speaking the words or phrases 202. The video stream 204 includes a face 203 of the user 201. At the same time, the audio capture device 116 captures an audio stream 206 of the user's voice speaking the words or phrases 202.

The video stream 204 and the audio stream 206 are then passed to the enrollment module 122. In this example, the enrollment module is illustrated as including a signature generation component 208 and a voice recognition component 210. The signature generation component 208 generates a dynamic face and voice signature 212, which uniquely identifies, the user by correlating facial motion of the face 203 of the user 201 in the processed video stream 204 to the audio stream 206 of the user speaking. For example, the changes in volume, pitch, and cadence of the user's voice in the audio stream 206 is correlated to the facial motions that the user makes when speaking in order to generate the dynamic face and voice signature 212.

In one or more implementation, the signature generation component 208 generates the dynamic face and voice signature 212 by processing the video stream 204 to identify the face 203 of the user 201. Then, the signature generation component 208 filters the video stream 204 by removing portions of the video stream 204 which do not include the face 203 of the user. The signature generation component 208 then converts frames of the video stream 204 to a distance graph of the face 203 of the user 201. The distance graph includes relative distances between points of interest on face 203 of the user 201, such as eyes, nose, mouth, and so forth. This can be detected via a variety of known detection algorithms, such as DoH. Thus, the processed video 204 stream includes incremental samples of the distance graph where indexing for points of interest are conserved (e.g., features are tracked).

Next, the signature generation component 208 correlates the voice of the user in the audio stream 206 to the facial motions of the user in the processed video stream. To do so, the voice of the user is detected in the audio stream, localized, and paired with the distance graph of the face 203 of the user 201 in the processed video stream. The signature generation component 208 then correlates the voice of the user with facial motions of the face 203 of the user 201 in order to generate the dynamic face and voice signature 212.

In some cases, the signature generation component 208 applies a machine learning model 214 to the video stream 204 and audio stream 206 in order to generate the dynamic face and voice signature 212. The machine learning model 214 is trained to identify a user based on the correlation between the user's facial motion and voice. The machine learning model 214 may be implemented in a variety of different ways, such as a hidden Markov model (HMM), a long-short term memory, and so forth. In some cases, the machine learning model 214 may also include dynamic time warping techniques which may be applied to account for the user speaking at varying speeds.

In addition, the voice recognition component 210 scans the audio stream 206 to identify the user's voice speaking the words or phrases 202, and converts the audio stream 206 into text of an authentication phrase 216. In FIG. 2, for example, the voice recognition component 210 would convert the audio stream 206 into text of "Unlock my computer". In some cases, enrollment module 122 asks the user to repeat this authentication phrase one or more times to verify that the authentication phase has been accurately captured and recorded. The voice recognition component 210 may be implemented as any type of voice recognition component, such as Cortana by Microsoft®.

Enrollment module 122 then stores the dynamic face and voice signature 212 and the authentication phrase 216 in an authentication database 218. Subsequently, the recognition module 124 can access the access the authentication database 218 in order to verify the user and provide access to a device or resources, as is discussed in more detail below in the section titled "Recognition Module".

In one or more implementations, the enrollment module 122 supports multiple different authentication phrases, with different semantics, such that the user can customize the system to grant different types of access based on different vocalized phrases. For example, a first phrase can be used to access a first desktop permitting access to personal information, while a second phrase can be used to access a second desktop permitting access to work information.

Recognition Module

Figure 3:
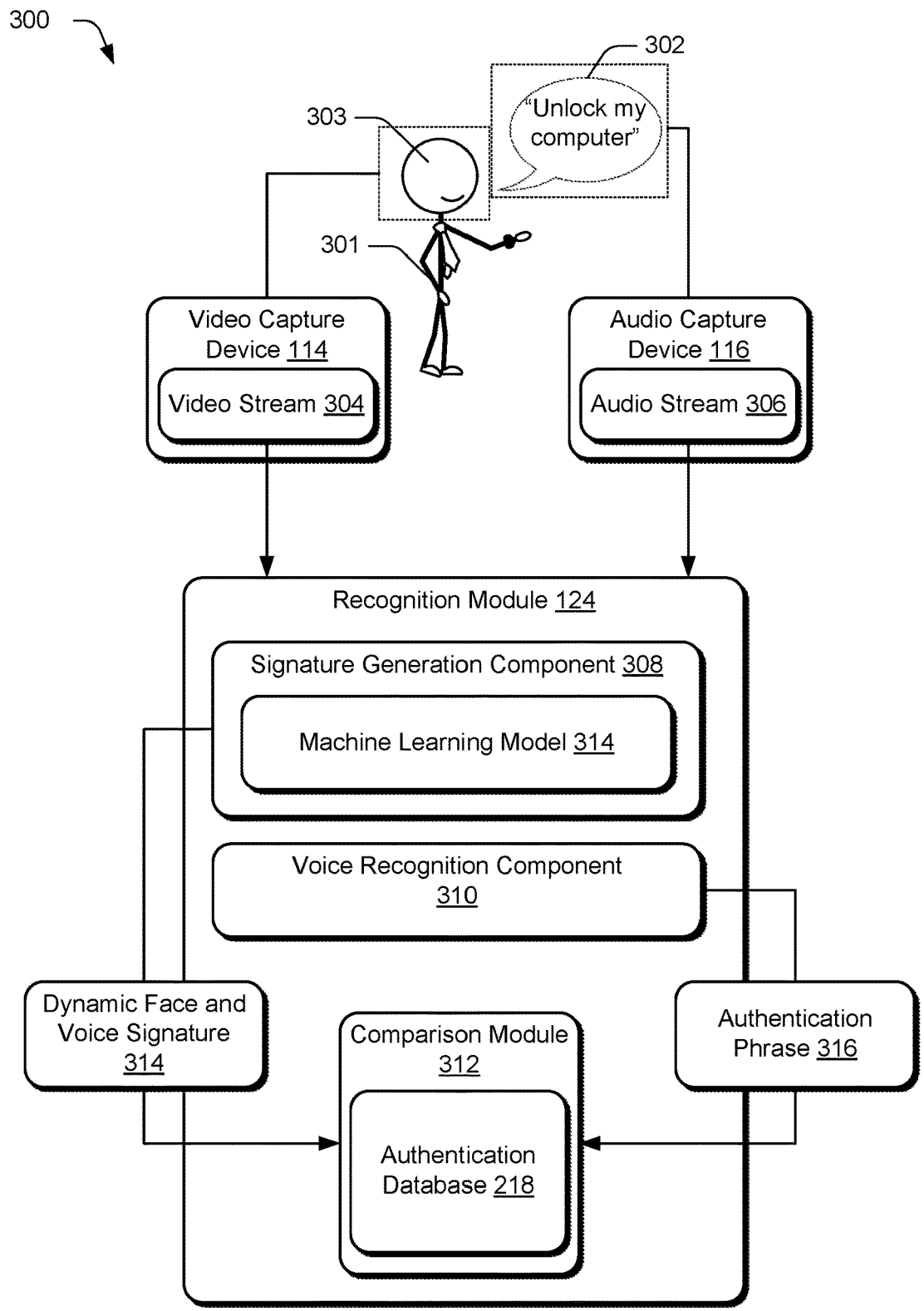
FIG. 3 illustrates a more-detailed example of the recognition module of the authentication system of FIG. 1 in accordance with one or more implementations.

FIG. 3 illustrates a more-detailed example 300 of the recognition module 124 of the authentication system 120 of FIG. 1 in accordance with one or more implementations.

In this example, recognition module 124 monitors for the presence of a user 301 and/or user intent to access computing device 102. For example, recognition module can detect the presence of user 301 using presence sensor 118 to determine that the user has walked into a room. Alternately, user intent to access computing device 102 can be determined based on the user opening a laptop computing device, moving a mouse attached to a desktop computer, and so forth.

In response to detecting the presence of the user 301 and/or user intent to access computing device 102, the recognition module 124 may prompt the user to speak an authentication phrase, or the user may simply speak the authentication phrase in order to access the device.

The user then speaks one or more words or phrases 302, which in this example is "unlock my computer". The recognition module 124 triggers video capture device 114 to capture a video stream 304 of the user 301 as the user speaks the one or more words or phrases 302, and also triggers audio capture device 116 to capture an audio stream 306 of the user speaking the one or more words or phrases 302. Notably, the video stream 304 includes a face 303 of the user 301.

The video stream 304 and the audio stream 306 are then passed to the recognition module 124. In this example, the recognition module is illustrated as including a signature generation component 308, a voice recognition component 310, and a comparison module 312. The signature generation component 308 and voice recognition component 310 may correspond to the signature generation component 208 and the voice recognition component 210, respectively, of the enrollment module 122 of FIG. 2. Alternately, these components may be implemented as separate from the components of the enrollment module 122.

The signature generation component 308 processes the video stream 304 to identify the face 303 of the user 301. Then, the signature generation component 308 generates a dynamic face and voice signature 314 by correlating facial motion of the face 303 of the user 301 in the processed video stream 304 to the audio stream 306 of the user speaking. For example, the changes in volume, pitch, and cadence of the user's voice in the audio stream 306 is correlated to the facial motions that the user makes when speaking in order to generate the dynamic face and voice signature 314.

In one or more implementations, the signature generation component 308 generates the dynamic face and voice signature 314 by processing the video stream 304 to identify the face 303 of the user 301 in the video stream. In some cases, if multiple faces are detected in the video stream 306, the signature generation component 308 may be configured to identify the face of the user based on a preliminary determination that the facial characteristics of the user match the facial characteristics of the authorized user. Then, the signature generation component 308 filters the video stream 304 by removing portions of the video stream 304 which do not include the face 303 of the user 301. The signature generation component 308 then converts frames of the video stream 304 to a distance graph of the face 303 of the user 301. The distance graph includes relative distances between points of interest on face 303 of the user 301, such as eyes, nose, mouth, and so forth. This can be detected via a variety of known detection algorithms, such as DoH. Thus, the processed video 304 stream includes incremental samples of the distance graph where indexing for points of interest are conserved (e.g., features are tracked).

Next, the signature generation component 308 attempts to correlate the voice of the user in the audio stream 306 to the facial motions of the user in the processed video stream. To do so, the voice of the user 301 is detected in the audio stream, localized, and paired with the distance graph of the face 303 of the user 301 in the processed video stream. The signature generation component then correlates the voice of the user with facial motions of the face 303 of the user 301 in order to generate the dynamic face and voice signature 314.

In some cases, the signature generation component 308 applies a machine learning model 314 to the video stream 304 and audio stream 306 in order to generate the dynamic face and voice signature 314. The machine learning model 314 is trained to identify a user based on the correlation between the user's facial motion and voice. The machine learning model 314 may be implemented in a variety of different ways, such as a hidden Markov model (HMM), a long-short term memory, and so forth. In some cases, the machine learning model 314 may also include dynamic time warping techniques which may be applied to account for the user speaking at varying speeds.

Notably, if the signature generation component 308 is unable to correlate the facial motions of the user to the voice of the user, then the recognition module determines that the user 301 is not actually speaking. For example, if a malicious user attempted to use a three-dimensional model of the user's face along with an audio recording of the user's voice, the recognition module 124 would not be able to correlate the facial motion to the user's voice, and thus would prevent the user from being authenticated.

After generation of the dynamic face and voice signature 314, the recognition module 124 passes the dynamic face and voice signature 314 to the comparison module 312. The comparison module 312 verifies that the user 301 is the authorized user, by comparing the dynamic face and voice signature 314 to the stored dynamic face and voice signature 212 generated during the enrollment phase and stored in authentication database 218. If the signatures match, then the recognition module verifies that the user 301 is the authorized user.

Once the user 301 is verified as the authorized user, the recognition module 124 causes the voice recognition component 310 to scan the audio stream 306 to detect an authentication phrase 316 spoken by the authorized user. To do so, the voice recognition component 310 converts the audio stream 306 to text, and then compares the text to one or more previously generated authentication phrases 216 stored in the authentication database 218. If a match is detected, then the user is authenticated and granted access to a device (e.g., computing device 102) or resources of the device in accordance with the detected authentication phrase 316 in the audio stream 306. Alternately, if the authentication phrase 316 is not detected, the user is prevented from accessing the device or resources, even if the user is verified based on the dynamic face and voice signature 314.

In one or more implementations, the recognition module 124 may delay the processing of the audio stream 306, to recognize the authentication phrase 316, until the user is verified as the authorized user. For example, the audio stream 306 may be stored in a cache until the user is verified as the authorized user, at which time the audio stream 306 is passed from the cache to the voice recognition component 310. If, however, the user is not verified as the authorized user, then the audio stream 306 may simply be deleted from the cache without ever passing the audio stream 306 to the voice recognition component 310. Alternately, the recognition module 124 may case the voice recognition component 310 to scan for and detect the authentication phrase 316 at substantially the same time as the signature generation component 308 is generating the dynamic face and voice signature 314.

In one or more implementations, the type of access to the device or resources may be based on the detected authentication phrase. The authentication system 120 is configured to support multiple different authentication phrases for each user, where each authentication phrase may be associated with a different type of access to the device or resources. For example, in response to detecting a first authentication phrase, a first type of access to the device or resources can be provided to the user (e.g., unlocking a laptop and providing access to personal documents), and in response to detecting a second authentication phrase, a second type of access to the device or resources can be provided to the user (e.g., unlocking the laptop and providing access to work-related documents but not the personal documents).

In one or more implementations, the authentication system can be configured to recognize a duress phrase. In response to detecting the duress phrase, the authentication system can initiate an emergency action, such as by automatically contacting the authorities or encrypting all of the files on the user's device. This functionality may be useful in situations where a malicious actor forces the user to speak the authentication phrase in order to gain access to the user's device.

Example Method

The methods described herein are shown as sets of blocks that specify operations performed but are not necessarily limited to the order or combinations shown for performing the operations by the respective blocks. The techniques are not limited to performance by one entity or multiple entities operating on one device.

Figure 4:
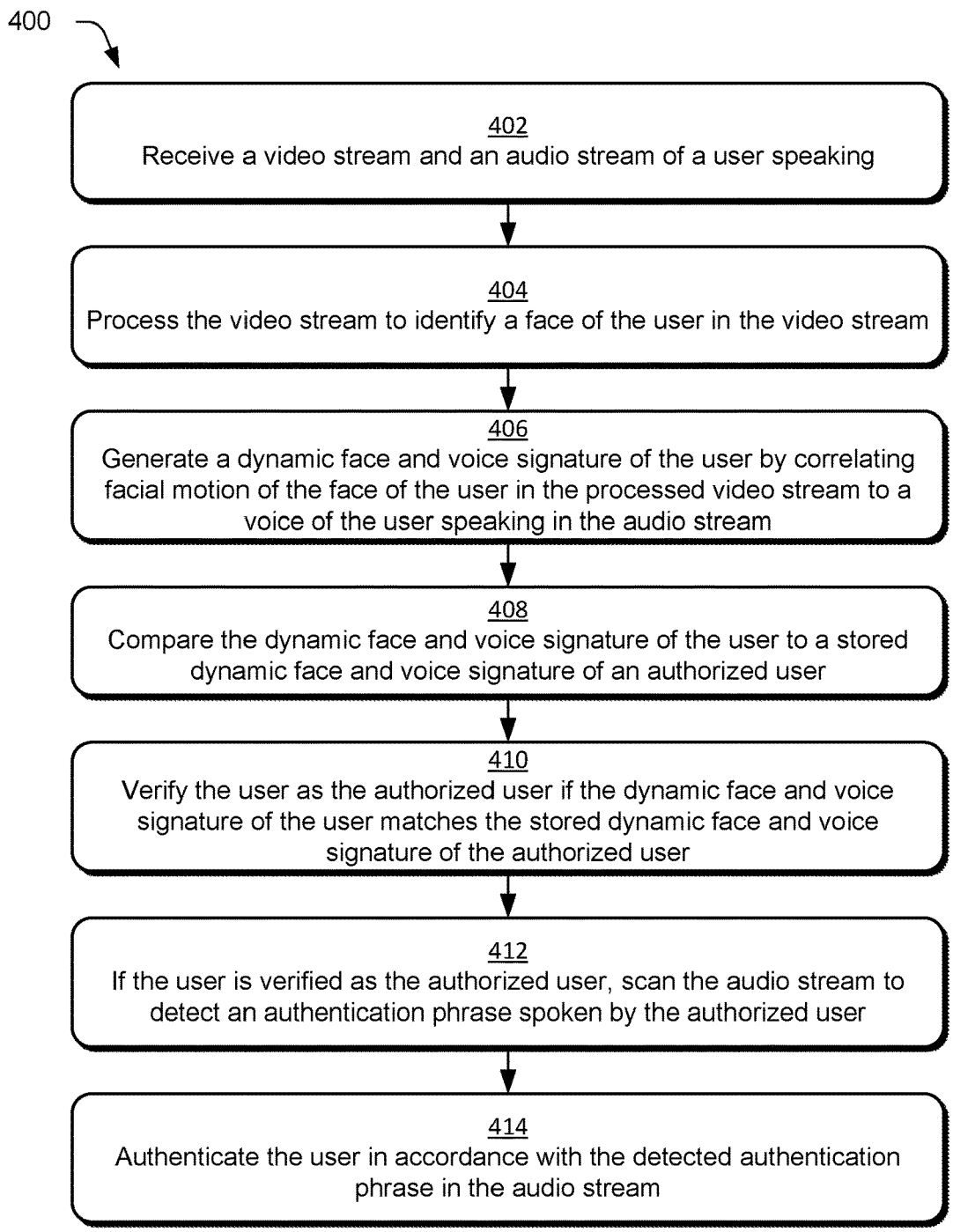
FIG. 4 illustrates an example method of authenticating a user based on a face and voice signature and an authentication phrase in accordance with one or more implementations.

FIG. 4 illustrates an example method 400 of authenticating a user based on a face and voice signature and an authentication phrase in accordance with one or more implementations.

At 402, a video stream and an audio stream of a user speaking is received. For example, recognition module 124 receives a video stream 304 and an audio stream 306 of a user 301 speaking one or more words or phrases 302.

At 404, the video stream is processed to identify a face of the user. For example, the recognition module 124 processes the video stream 304 to identify a face 303 of the user 301.

At 406, a dynamic face and voice signature of the user is generated by correlating facial motion of the face of the user in the processed video stream to a voice of the user speaking in the audio stream. For example, the signature generation component 308 generates a dynamic face and voice signature 314 by correlating facial motion of the face 303 of the user 301 in the processed video stream 304 to the voice of the user speaking in the audio stream 306.

At 408, the dynamic face and voice signature of the user is compared to a stored dynamic face and voice signature of an authorized user. For example, the recognition module 124 compares the dynamic face and voice signature 314 of the user 301 to a stored dynamic face and voice signature 212 of an authorized user that is generated during the enrollment phase and stored in authentication database 218.

At 410, the user is verified as the authorized user if the dynamic face and voice signature of the user matches the stored dynamic face and voice signature of the authorized user. For example, the recognition module 124 verifies the user as the authorized user if the dynamic face and voice signature 314 of the user matches the stored dynamic face and voice signature 212.

At 412, if the user is verified as the authorized user, the audio stream is scanned to detect an authentication phrase spoken by the authorized user. For example, the recognition module 124 employs a voice recognition component 310 to detect an authentication phrase 316 spoken by the authorized user.

At 414, the user is authenticated and access to a device or resources is provided to the user in accordance with the detected authentication phrase in the audio stream. For example, the recognition module 124 authenticates the user and provides access to a device or resources in accordance with the detected authentication phrase 316.

Example System and Device

FIG. 5 illustrates an example system generally at 1000 that includes an example computing device 502 that is representative of one or more computing systems and/or devices that may implement the various techniques described herein. The computing device 502 may be, for example, a server of a service provider, a device associated with the client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on)

as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 502, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including authentication system 120, and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the authentication system 120 on the computing device 502. The functionality of the authentication system 120 and other modules may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

Conclusion and Example Implementations

Example implementations described herein include, but are not limited to, one or any combinations of one or more of the following examples:

In one or more examples, a computer-implemented method for authenticating a user comprises: receiving a video stream and an audio stream of a user speaking; processing the video stream to identify a face of the user in the video stream; generating a dynamic face and voice signature of the user by correlating facial motion of the face of the user in the processed video stream to a voice of the user speaking in the audio stream; comparing the dynamic face and voice signature of the user to a stored dynamic face and voice signature of an authorized user; verifying the user as the authorized user if the dynamic face and voice signature of the user matches the stored dynamic face and voice signature of the authorized user; if the user is verified as the authorized user, scanning the audio stream to detect an authentication phrase spoken by the authorized user; and authenticating the user and providing access to a device or resources in accordance with the detected authentication phrase in the audio stream.

An example as described alone or in combination with any of the examples described above or below, wherein the processing the video stream further comprises converting frames of the video stream to a distance graph of the face of the user.

An example as described alone or in combination with any of the examples described above or below, wherein the distance graph comprises relative distances between points of interest of the face of the user.

An example as described alone or in combination with any of the examples described above or below, wherein the distance graph is generated using a DoH detection algorithm.

An example as described alone or in combination with any of the examples described above or below, wherein the generating the dynamic face and voice signature further comprises: detecting the voice of the user speaking in the audio stream; localizing the voice of the user speaking in the audio stream; and pairing the localized voice of the user speaking in the audio stream to the distance graph of the face of the user in the processed video stream.

An example as described alone or in combination with any of the examples described above or below, wherein the generating the dynamic face and voice signature further comprises applying dynamic time warping to the distance graph of the face of the user to account for the user speaking with varying speeds.

An example as described alone or in combination with any of the examples described above or below, wherein the dynamic face and voice signature is generated using one or more machine-learning models.

An example as described alone or in combination with any of the examples described above or below, wherein the one or more machine learning models includes a hidden Markov model (HMM).

An example as described alone or in combination with any of the examples described above or below, wherein the one or more machine learning models comprises a long-short term memory.

An example as described alone or in combination with any of the examples described above or below, further comprising preventing access to the device or resources if the authentication phrase is not detected.

An example as described alone or in combination with any of the examples described above or below, wherein the authenticating further comprises: in response to detecting a first authentication phrase, providing a first type of access to the device or resources; and in response to detecting a second authentication phrase, providing a second type of access to the device or resources.

An example as described alone or in combination with any of the examples described above or below, further comprising initiating an emergency action in response to detecting a duress phrase in the audio stream.

In one or more examples, a system comprises: a video capture device configured to capture a video stream of a user speaking: a voice capture device configured to capture an audio stream of the user speaking; one or more memories and a processing system to implement an authentication system, the authentication system configured to perform operations comprising: receiving the video stream of the user speaking from the video capture device, and receiving the audio stream of the user speaking from the audio capture device; processing the video stream to identify a face of the user; generating a dynamic face and voice signature by correlating facial motion of the face of the user in the processed video stream to a voice of the user speaking in the audio stream; comparing the dynamic face and voice signature of the user to a stored dynamic face and voice signature of an authorized user; and verifying the user as the authorized user if the dynamic face and voice signature of the user matches the stored dynamic face and voice signature of the authorized user.

An example as described alone or in combination with any of the examples described above or below, if the user is verified as the authorized user, scanning the audio stream to detect an authentication phrase spoken by the authorized user; and authenticating the user and providing access to a device or resources in accordance with the detected authentication phrase in the audio stream.

An example as described alone or in combination with any of the examples described above or below, wherein the processing the video stream further comprises converting frames of the video stream to a distance graph of the face of the user, the distance graph comprising relative distances between points of interest of the face of the user.

An example as described alone or in combination with any of the examples described above or below, wherein the generating the dynamic face and voice signature further comprises: detecting the voice of the user speaking in the audio stream; localizing the voice of the user speaking in the audio stream; and pairing the localized voice of the user speaking in the audio stream to the distance graph of the face of the user in the processed video stream.

An example as described alone or in combination with any of the examples described above or below, wherein the dynamic face and voice signature is generated using a hidden Markov model (HMM).

An example as described alone or in combination with any of the examples described above or below, further comprising preventing access to the device or resources if the authentication phrase is not detected.

An example as described alone or in combination with any of the examples described above or below, wherein the authenticating further comprises: in response to detecting a first authentication phrase, providing a first type of access to the device or resources; and in response to detecting a second authentication phrase, providing a second type of access to the device or resources.

An example as described alone or in combination with any of the examples described above or below, further comprising initiating an emergency action in response to detecting a duress phrase in the audio stream.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method for authenticating a user, the method comprising:
   receiving a video stream and an audio stream of a user speaking;
   processing the video stream to identify a face of the user in the video stream;
   generating a dynamic face and voice signature of the user by correlating facial motion of the face of the user in the processed video stream to a voice of the user speaking in the audio stream;
   determining that the dynamic face and voice signature of the user substantially matches a stored dynamic face and voice signature of an authorized user;
   scanning the audio stream to detect an authentication phrase spoken by the user based on the determining that the dynamic face and voice signature of the user substantially matches the stored dynamic face and voice signature; and
   authenticating the user and providing access to a device or resources in accordance with the detected authentication phrase in the audio stream.

2. The computer-implemented method of claim 1, wherein the processing the video stream further comprises converting frames of the video stream to a distance graph of the face of the user.

3. The computer-implemented method of claim 2, wherein the distance graph comprises relative distances between points of interest of the face of the user.

4. The computer-implemented method of claim 2, wherein the distance graph is generated using a DoH detection algorithm.

5. The computer-implemented method of claim 2, wherein the generating the dynamic face and voice signature further comprises:
   detecting the voice of the user speaking in the audio stream;
   localizing the voice of the user speaking in the audio stream; and
   pairing the localized voice of the user speaking in the audio stream to the distance graph of the face of the user in the processed video stream.

6. The computer-implemented method of claim 2, wherein the generating the dynamic face and voice signature further comprises applying dynamic time warping to the distance graph of the face of the user to account for the user speaking with varying speeds.

7. The computer-implemented method of claim 1, wherein the dynamic face and voice signature is generated using one or more machine-learning models.

8. The computer-implemented method of claim 7, wherein the one or more machine learning models includes a hidden Markov model (HMM).

9. The computer-implemented method of claim 7, wherein the one or more machine learning models comprises a long-short term memory.

10. The computer-implemented method of claim 1, further comprising preventing access to the device or resources based on a failure to re-authenticate the user.

11. The computer-implemented method of claim 1, wherein the authenticating further comprises:
   in response to detecting a first authentication phrase, providing a first type of access to the device or resources; and in response to detecting a second authentication phrase, providing a second type of access to the device or resources.

12. The computer-implemented method of claim 1, further comprising initiating an emergency action in response to detecting a duress phrase in the audio stream.

13. A system comprising:
a video capture device configured to capture a video stream of a user speaking;
a voice capture device configured to capture an audio stream of the user speaking;
one or more memories and a processing system to implement an authentication system, the authentication system configured to perform operations comprising:
receiving the video stream of the user speaking from the video capture device, and receiving the audio stream of the user speaking from the audio capture device;
processing the video stream to identify a face of the user;
generating a dynamic face and voice signature by correlating facial motion of the face of the user in the processed video stream to a voice of the user speaking in the audio stream;
determining that the dynamic face and voice signature of the user substantially matches a stored dynamic face and voice signature of an authorized user; and
scanning the audio stream to detect an authentication phrase spoken by the user based on the determining that the dynamic face and voice signature of the user substantially matches the stored dynamic face and voice signature.

14. The system of claim 13, further comprising:
authenticating the user and providing access to a device or resources in accordance with the detected authentication phrase in the audio stream.

15. The system of claim 13, wherein the processing the video stream further comprises converting frames of the video stream to a distance graph of the face of the user, the distance graph comprising relative distances between points of interest of the face of the user.

16. The system of claim 15, wherein the generating the dynamic face and voice signature further comprises:
detecting the voice of the user speaking in the audio stream;
localizing the voice of the user speaking in the audio stream; and
pairing the localized voice of the user speaking in the audio stream to the distance graph of the face of the user in the processed video stream.

17. The system of claim 13, wherein the dynamic face and voice signature is generated using a hidden Markov model (HMM).

18. The system of claim 13, further comprising preventing access to the device or resources if the authentication phrase is not detected.

19. The system of claim 13, wherein the authenticating further comprises:
in response to detecting a first authentication phrase, providing a first type of access to the device or resources; and
in response to detecting a second authentication phrase, providing a second type of access to the device or resources.

20. The system of claim 13, further comprising initiating an emergency action in response to detecting a duress phrase in the audio stream.

* * * * *